US012748077B2

(12) United States Patent
Smith et al.

(10) Patent No.: US 12,748,077 B2
(45) Date of Patent: Sep. 29, 2026

(54) PHOTOACOUSTIC MICROSCOPY PLATFORM

(71) Applicants: Barbara Smith, Tempe, AZ (US); Ethan Marschall, Queen Creek, AZ (US); Joel Lusk, Mesa, AZ (US); Christopher Miranda, Mesa, AZ (US)

(72) Inventors: Barbara Smith, Tempe, AZ (US); Ethan Marschall, Queen Creek, AZ (US); Joel Lusk, Mesa, AZ (US); Christopher Miranda, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 186 days.

(21) Appl. No.: 18/632,622

(22) Filed: Apr. 11, 2024

(65) Prior Publication Data

US 2024/0345031 A1 Oct. 17, 2024

Related U.S. Application Data

(60) Provisional application No. 63/495,796, filed on Apr. 13, 2023.

(51) Int. Cl.

*G01N 29/06* (2006.01)
*G01N 29/24* (2006.01)
*G01N 29/28* (2006.01)

(52) U.S. Cl.

CPC ..... *G01N 29/0681* (2013.01); *G01N 29/2418* (2013.01); *G01N 29/28* (2013.01)

(58) Field of Classification Search

None

See application file for complete search history.

(56) References Cited

U.S. PATENT DOCUMENTS

| | | | | | |
|---|---|---|---|---|---|
| 2020/0340954 | A1* | 10/2020 | Smith | .................. | A61B 5/0095 |
| 2020/0398268 | A1* | 12/2020 | Smith | ................ | G01N 21/1702 |
| 2021/0353782 | A1* | 11/2021 | Smith | .................. | A61B 5/0095 |
| 2022/0160289 | A1* | 5/2022 | Smith | .................. | A61B 5/4064 |
| 2022/0365209 | A1* | 11/2022 | Lam | ..................... | A61B 5/0095 |

OTHER PUBLICATIONS

Jeon, Seungwan, et al. "Review on practical photoacoustic microscopy." Photoacoustics 15 (2019): 100141.

* cited by examiner

*Primary Examiner* — Eric S. McCall
*Assistant Examiner* — Nigel H Plumb
(74) *Attorney, Agent, or Firm* — Riverside Law LLP

(57) ABSTRACT

In some aspects, the present invention relates to a microscopy device having a body with a cavity, the cavity having a bottom and plurality of walls extending upward from the bottom, and forming an inside surface and an outside surface of the body, the cavity further comprising an opening opposite the bottom, at least one transparent window in the bottom, and an adapter extending outward from a first wall of the plurality of walls, wherein the body has a length ranging between about 10 mm and about 250 mm, a width ranging between about 10 mm and about 250 mm, and a height ranging between about 5 mm and about 100 mm.

18 Claims, 13 Drawing Sheets

100

PHOTOACOUSTIC MICROSCOPY PLATFORM

CROSS-REFERENCE TO RELATED APPLICATIONS

This application claims priority to and the benefit of U.S. Provisional Application No. 63/495,796, filed Apr. 13, 2023, the disclosure of which is incorporated herein by reference in its entirety.

BACKGROUND OF THE INVENTION

Photoacoustic imaging (PAI) has many interesting advantages, such as deep imaging depth, high image resolution, and high contrast to intrinsic and extrinsic chromophores, enabling morphological, functional, and molecular imaging of living subjects. Photoacoustic microscopy (PAM) is a form of PAI, inheriting its characteristics and finding use in both preclinical and clinical research. Over the years, PAM systems have been evolved in several forms and each form has its relative advantages and disadvantages. Thus, to maximize the benefits of PAM for a specific application, it is important to configure the PAM system optimally by targeting a specific application [Jeon, Seungwan, et al. "Review on practical photoacoustic microscopy." Photoacoustics 15 (2019): 100141]. A novel microscopy device that provides optimal characteristics for photoacoustic applications will help further PAI capabilities and provide new capabilities to preclinical and clinical research.

Thus, there is a need in the art to develop a novel photoacoustic microscopy platform to further PAI capabilities and aid preclinical and clinical research. The present invention meets this need.

SUMMARY OF THE INVENTION

In some aspects, the present invention relates to a microscopy device having a body with a cavity, the cavity having a bottom and plurality of walls extending upward from the bottom, and forming an inside surface and an outside surface of the body, the cavity further comprising an opening opposite the bottom, at least one transparent window in the bottom, and an adapter extending outward from a first wall of the plurality of walls, wherein the body has a length ranging between about 10 mm and about 250 mm, a width ranging between about 10 mm and about 250 mm, and a height ranging between about 5 mm and about 100 mm.

In some embodiments, the device further has a positioning stem with an adapter plate fixedly attached to the adapter of the device. In some embodiments, the device further has at least one threaded hole in the adapter of the device configured to fixedly attach the adapter plate of the positioning stem with a threaded bolt. In some embodiments, the threaded bolt is an M3 bolt. In some embodiments, the device further has a positioning stem extending outward from the adapter.

In some embodiments, the bottom comprises at least one transparent window, and the plurality of walls comprises at least one transparent window. In some embodiments, the at least one transparent window comprises at least one of a silicate glass, a soda-lime glass, a borosilicate glass, a lead glass, an aluminosilicate glass, a barium glass, a thorium oxide glass, a lanthanum oxide glass, an iron oxide glass, a cerivum (IV) oxide glass, a fluorine silicate glass, a glass-ceramic, a non-silicate glass, an acrylic glass, a plexiglass, a polycarbonate, a polyethylene terephthalate, a quartz glass, a glass slide, and/or a cover slip. In some embodiments, the at least one transparent window has a thickness ranging between 0.1 mm and 1 mm. In some embodiments, the at least one transparent window in the plurality of sidewalls comprises at least one glass cover slip.

In some embodiments, the body comprises at least one of titanium, aluminum, steel, alloy, PLA, PVA, PEEK, ABS, acrylic glass, plexiglass, polycarbonate, PTFE, PP, and/or UV-curing glue. In some embodiments, the inside surface of the body comprises at least one coating and the outside surface of the body comprises at least one coating. In some embodiments, the coating comprises at least one of biocompatible coating, antimicrobial coating, hydrophilic coating, hydrophobic coating, oleophobic coating, waterproof coating, polymer coating, acrylic coating, ceramic glass coating, reflective coating, anti-reflective coating, and/or UV-curing glue.

In some embodiments, the body is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular. In some embodiments, the at least one transparent window is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular.

In some embodiments, the cavity region has a volume ranging between 10,000 $mm^3$ and 200,000 $mm^3$.

In some aspects, the present invention relates to a system having any disclosed microscopy device of the present invention, and further having at least one of a transducer, a light source, and an objective. In some embodiments, the transducer is submerged in the liquid of the cavity region and configured to read at least one signal from at least one sample also submerged in the liquid. In some embodiments, the objective is configured to illuminate the sample through the at least one transparent window in the body.

In some aspects, the present invention relates to any disclosed microscopy device of the present invention and further having a computing device communicatively connected to a transducer and an objective, having a processor and a non-transitory computer-readable medium with instructions stored thereon, which when executed by a processor, performs the steps of illuminating a sample with the objective, and capturing signals from the sample with the transducer.

In some aspects, the present invention relates to a photoacoustic microscopy method having the steps of providing any disclosed microscopy device of the present invention, affixing the positioning stem to a rigid location, submerging a sample in the liquid, positioning an objective to illuminate the sample through the transparent window, and submerging a transducer in the liquid and reading signals from the sample.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

DETAILED DESCRIPTION

Figure 1A:
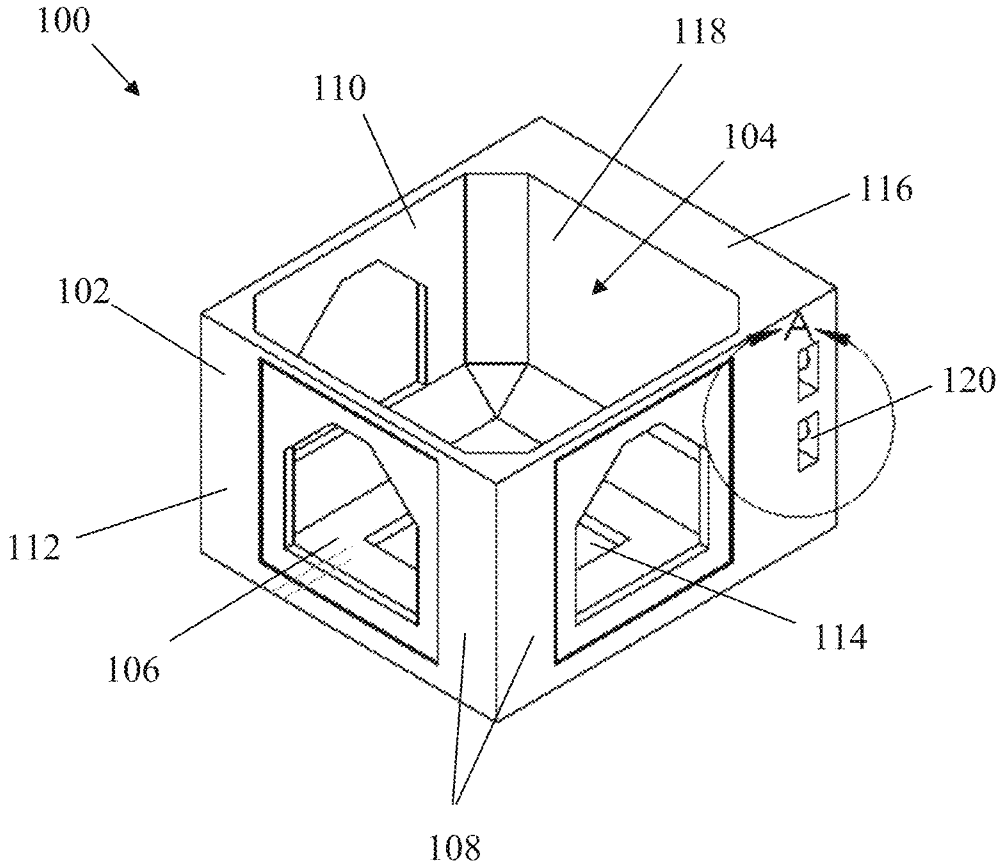
FIG. 1A through FIG. 1D depict various views of an exemplary microscopy device according to aspects of the present invention.
Figure 1B:
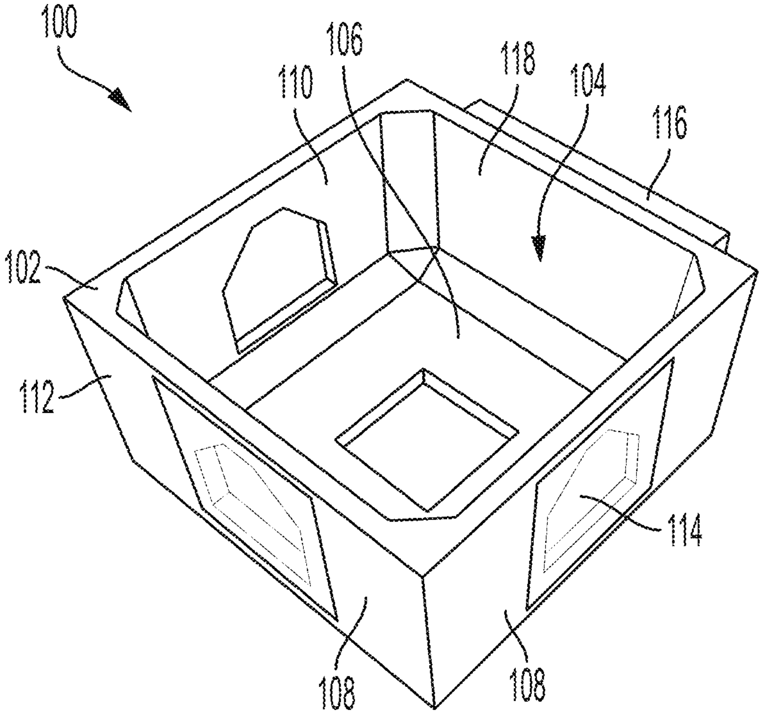
Figure 1C:
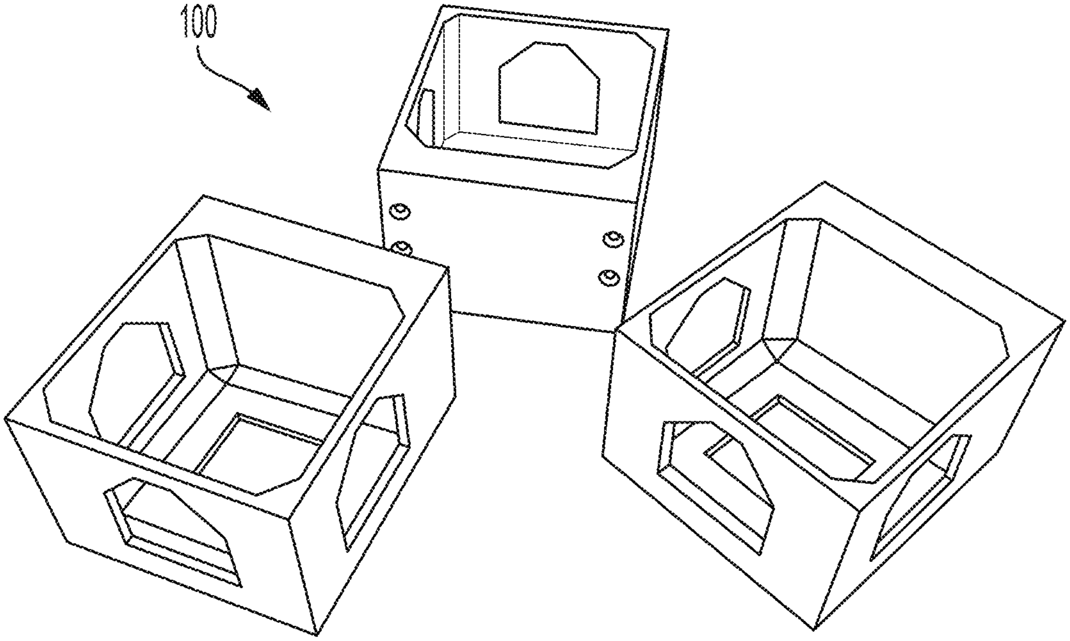
Figure 1D:
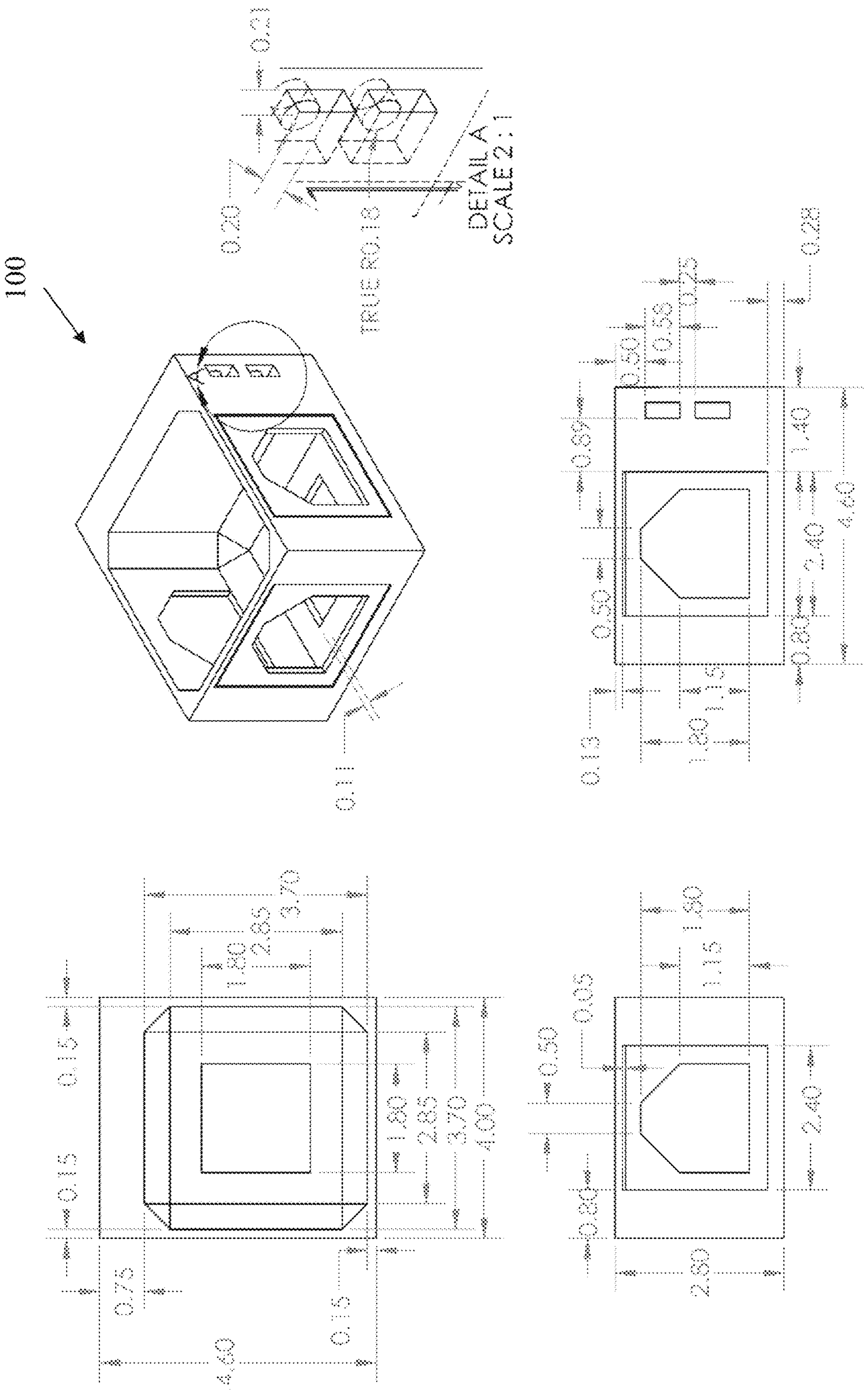
Figure 2A:
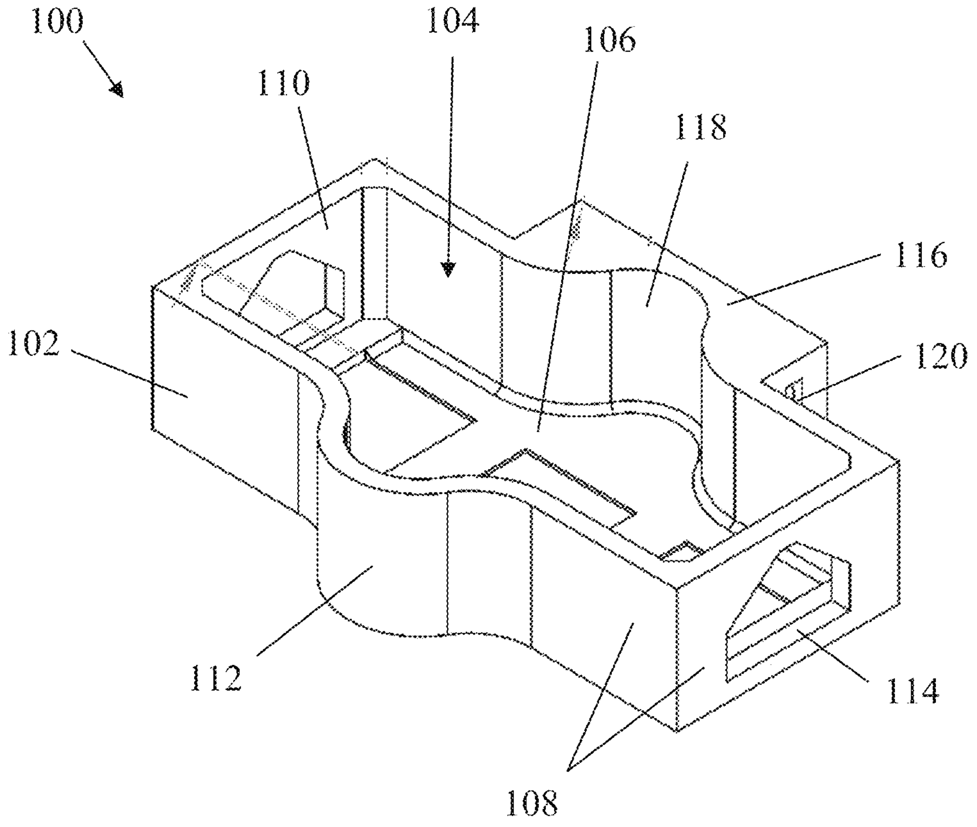
FIG. 2A through FIG. 2C depict various views of an exemplary microscopy device according to aspects of the present invention.
Figure 2B:
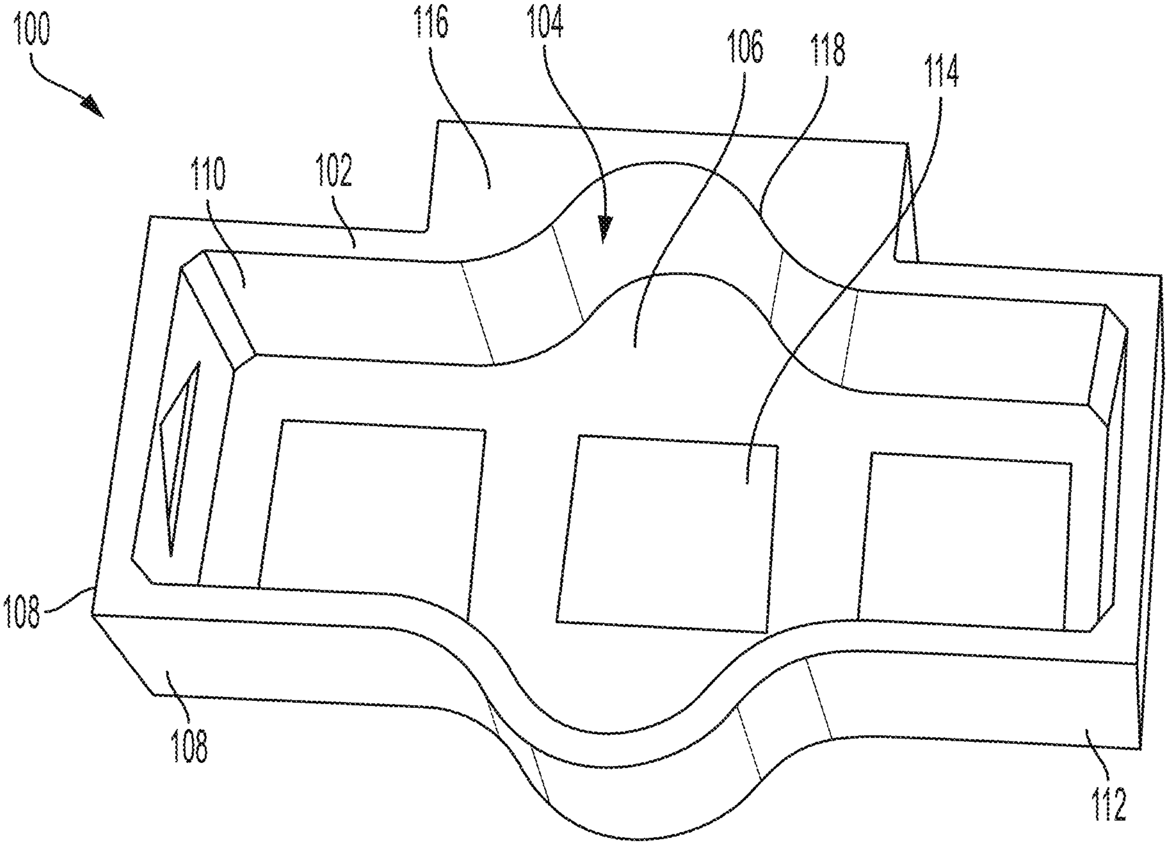
Figure 2C:
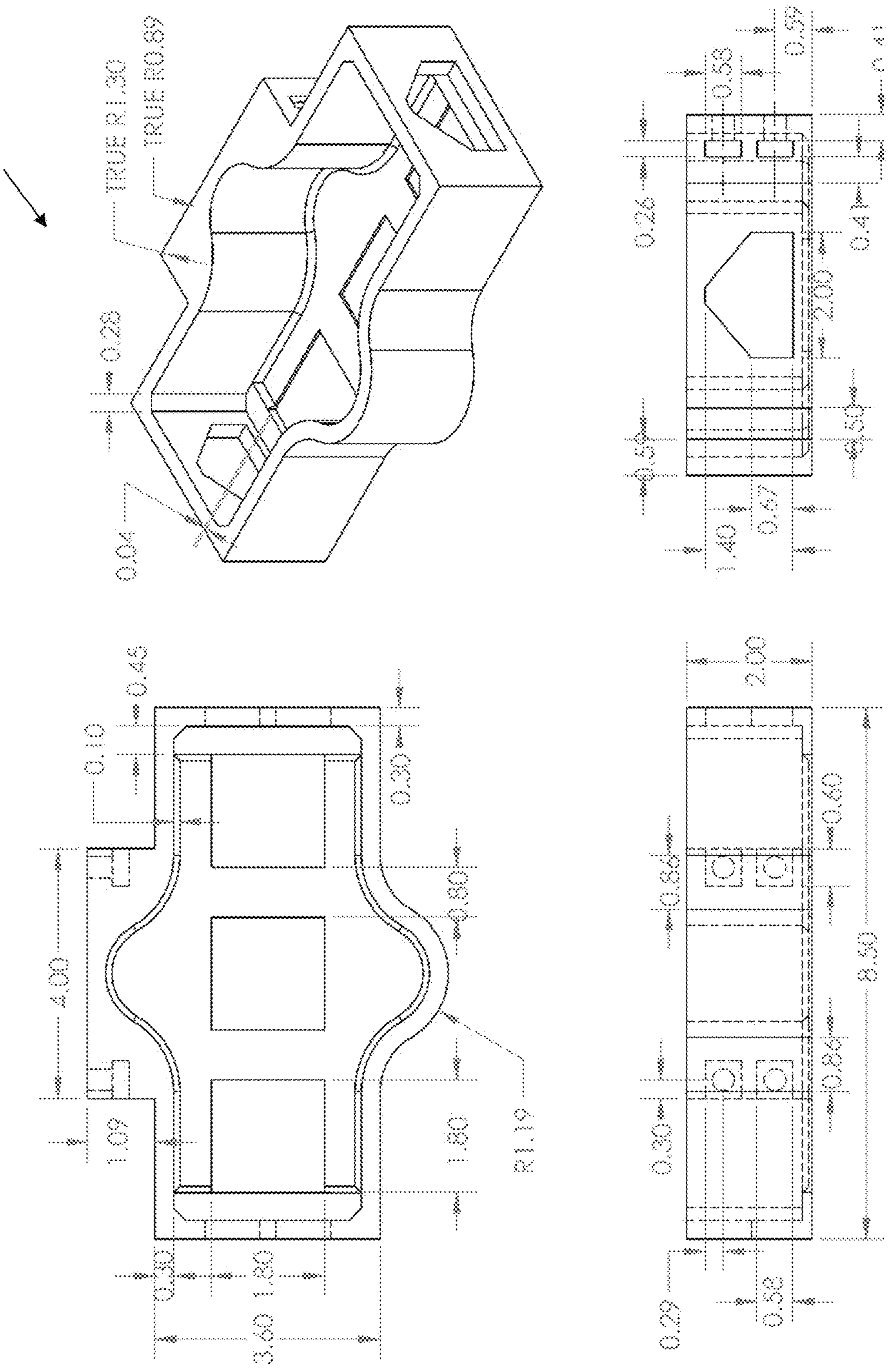
Figure 3A:
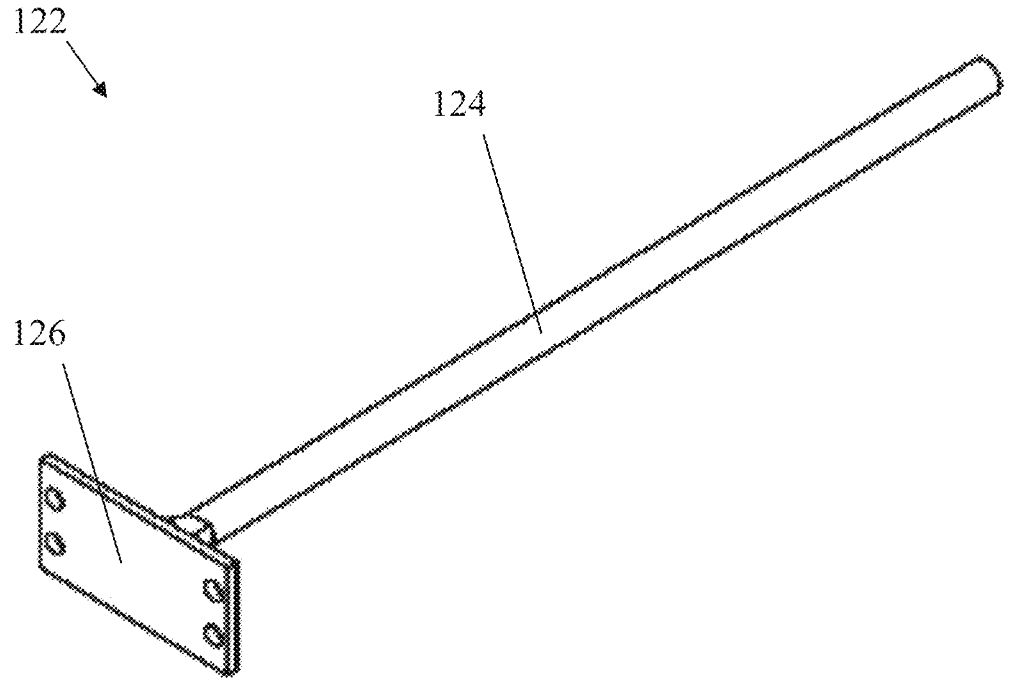
FIG. 3A and FIG. 3B depict an exemplary positioning stem with adapter plate for a microscopy device of the present invention.
Figure 3B:
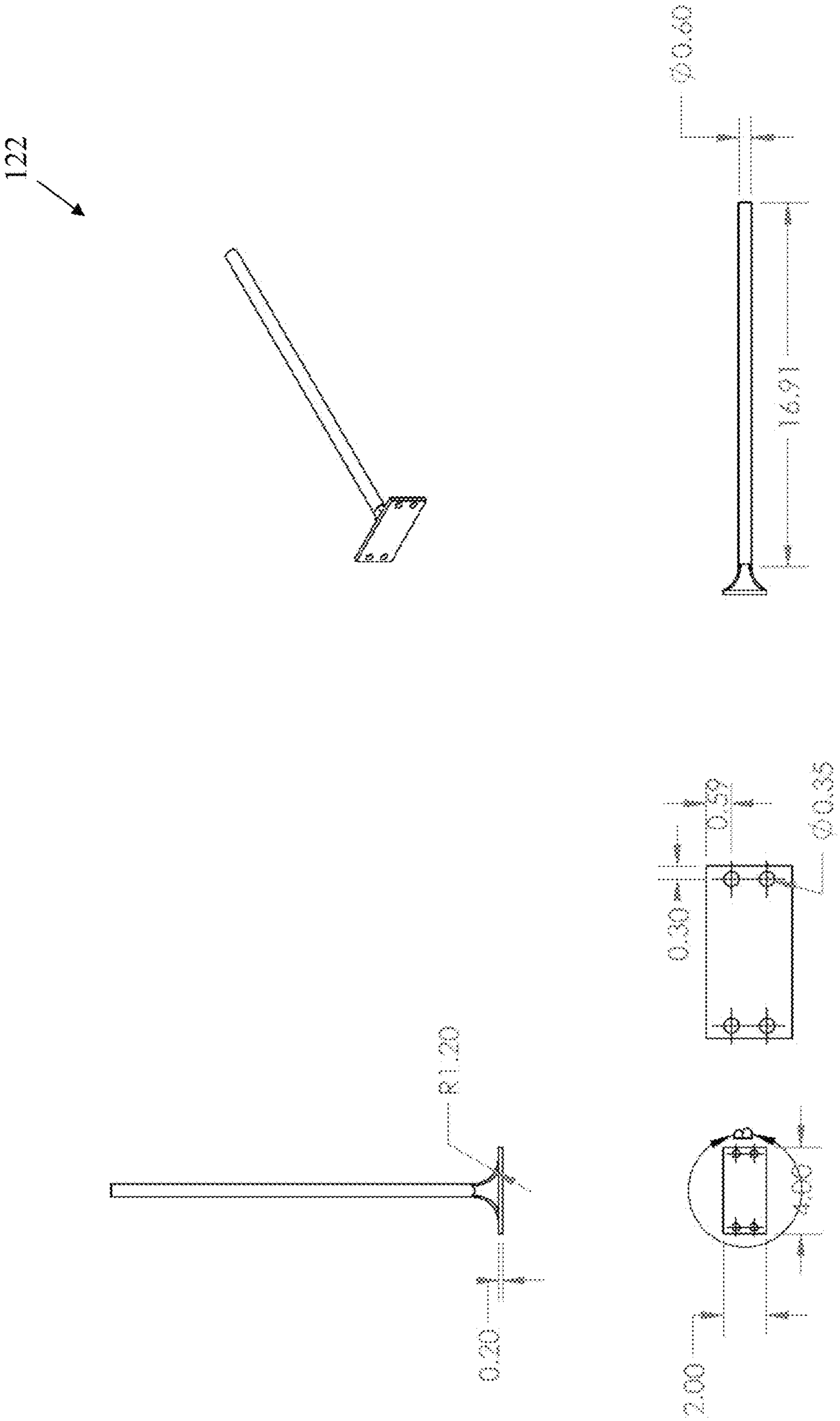
Figure 4A:
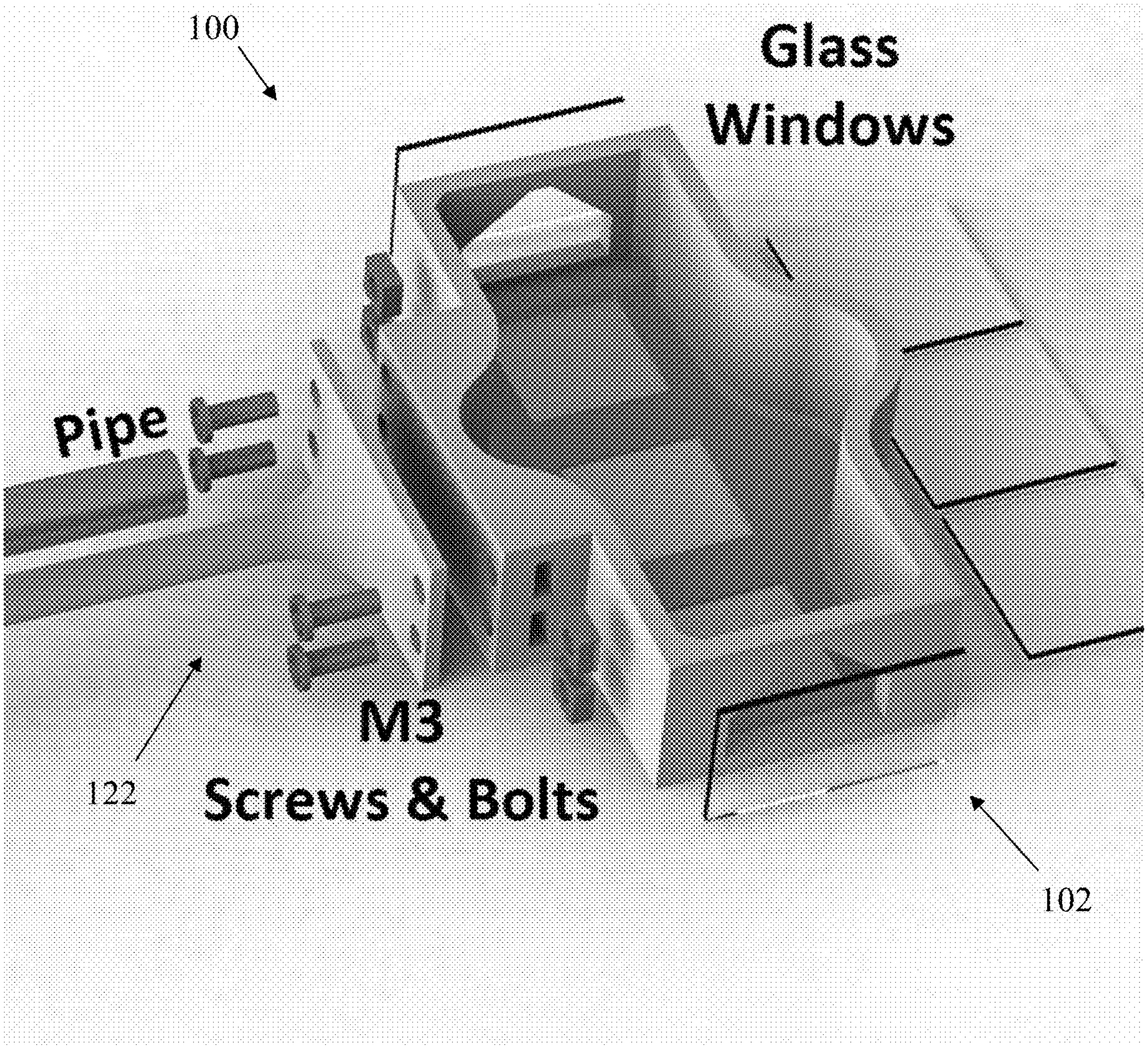
FIG. 4A and FIG. 4B depict various views of an exemplary microscopy device with an exemplary positioning stem attached to the body according to aspects of the present invention.
Figure 4B:
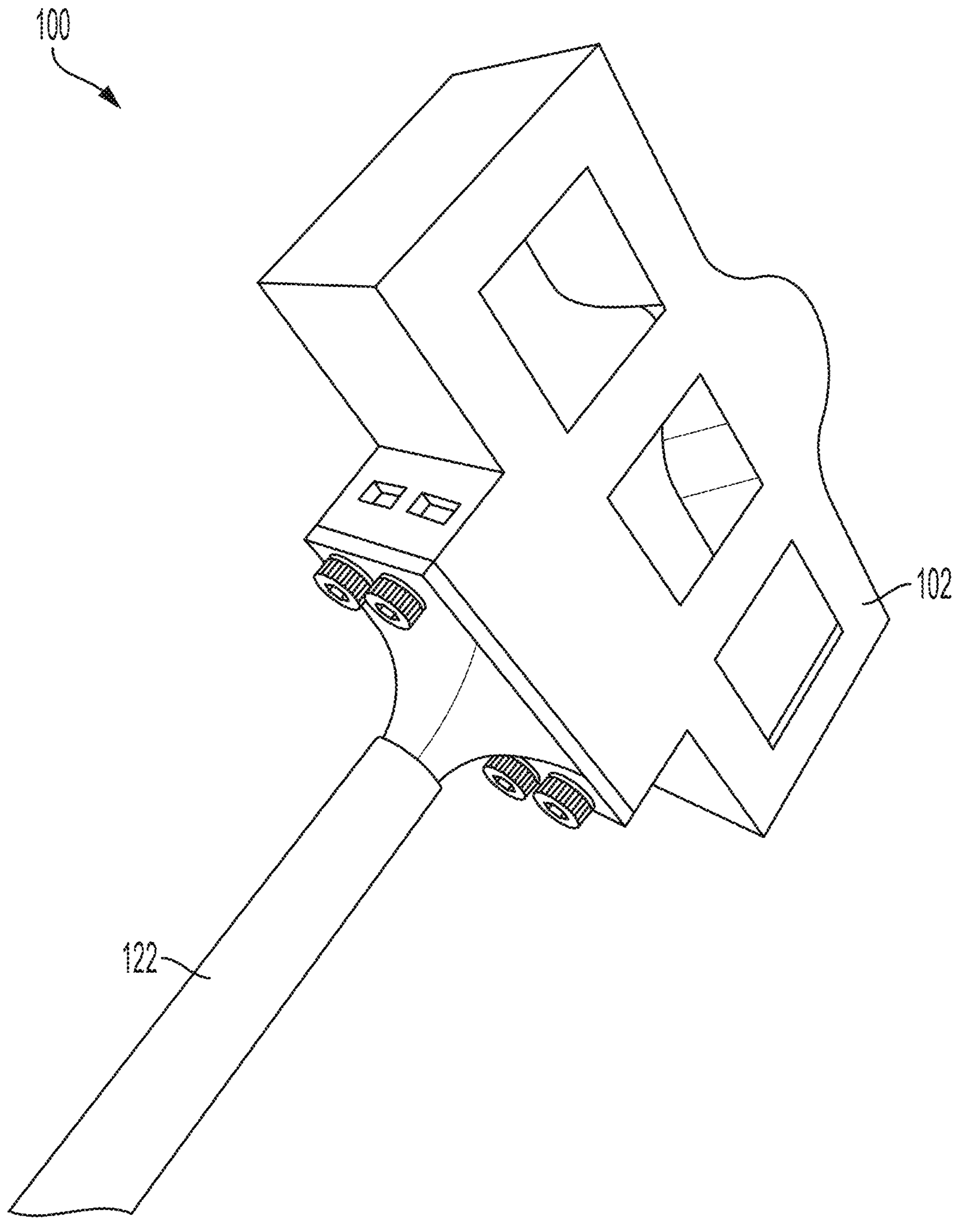
Figure 5:
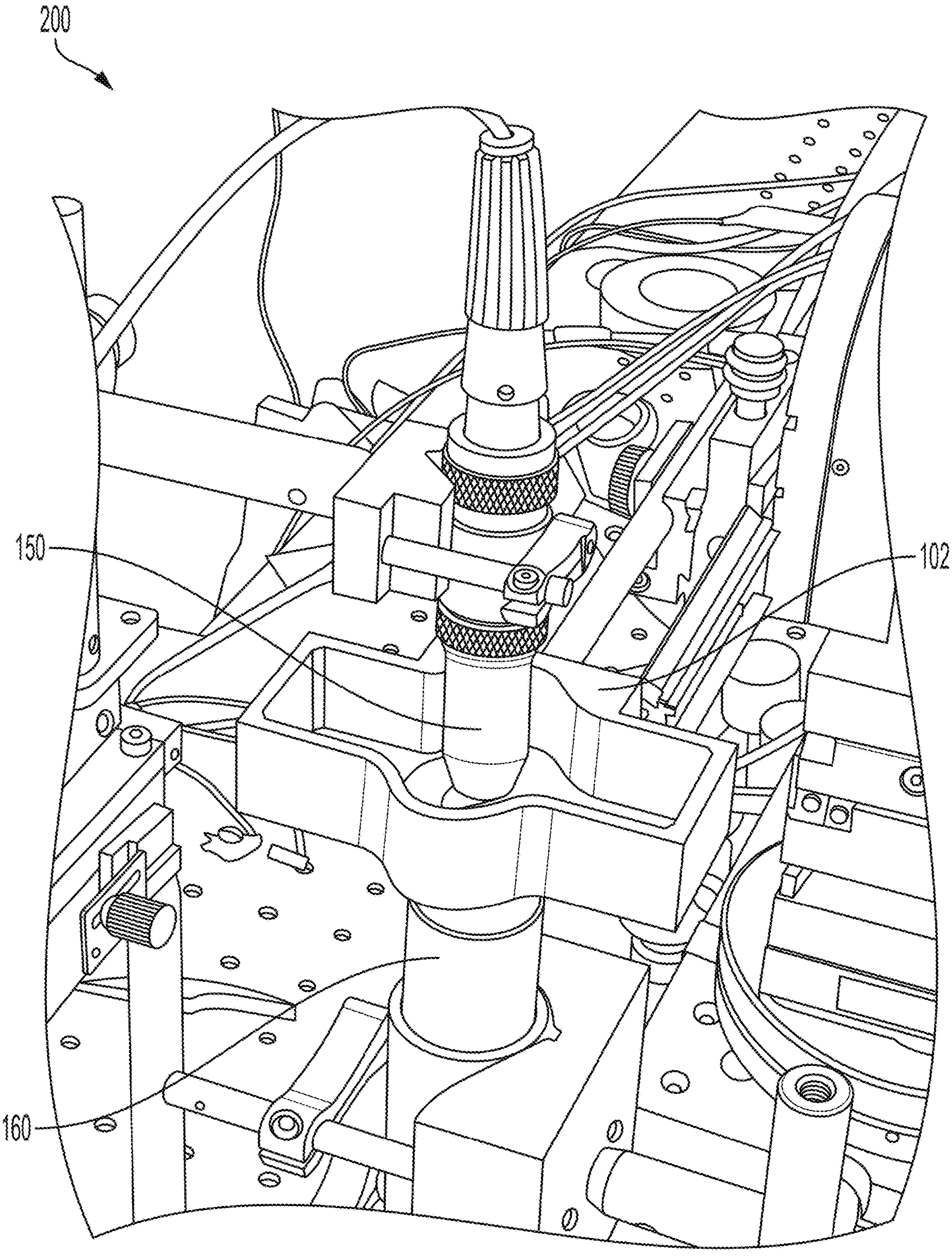
FIG. 5 depicts a system for photoacoustic detection comprising an exemplary microscopy device of the present invention, a transducer, and an objective.

It is to be understood that the figures and descriptions of the present invention have been simplified to illustrate elements that are relevant for a clear understanding of the present invention, while eliminating, for the purpose of clarity many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, exemplary materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Photoacoustic Microscopy Platform

In some aspects, the disclosed invention is directed to a microscopy device and system that enable photoacoustic microscopy of tissue. In some embodiments, the photoacoustic microscopy is performed on thin slices of brain tissue mounted in the device. In some embodiments, the microscopy device is configured to hold media and other liquids required to conduct acoustic waves collected by an immersible transducer.

Referring now to FIG. 1A through 1D, shown is an exemplary microscopy device 100 according to aspects of the present invention. In some embodiments, microscopy device 100 comprises a body 102 with a cavity 104. In some embodiments, cavity 104 comprises a bottom 106 and plurality of walls 108 extending upwards from bottom 106. In some embodiments, cavity 104 forms an inside surface 110 and outside surface 112 of body 102. In some embodiments, device 100 further comprises at least one transparent window 114 in bottom 106. In some embodiments, device 100 further comprises an adapter 116 extending outward from a first wall 118 of the plurality of walls 108.

Aspects of the present invention relate to a positioning stem for microscopy device 100 that allows for adjustable positioning of the device using laboratory equipment such as rods, connectors, and concentric clamps. In some embodiments, and referring now to FIGS. 3A through 4B, device 100 further comprises a positioning stem 122 with a shaft 124 extending from an adapter plate 126. In some embodiments, adapter plate 126 is fixedly attached to adapter 116 of device 100. In some embodiments, device 100 further comprises at least one threaded hole 120 in adapter 116 configured to fixedly attach adapter plate 126 of positioning stem 122 with a threaded bolt. In some embodiments, adapter 116 is fixedly attached to adapter plate 126 with M3 screws and bolts. In some embodiments, adapter 116 is fixedly attached to adapter plate 126 with standard methods as would be known by one of ordinary level of skill in the art, including, but not limited to, tabs, slots, tongues, grooves, pins, screws, clips, and the like. In some embodiments, adapter 116 is fixedly attached to adapter plate 126 with at least one adhesive.

Aspects of the present invention relate to at least one transparent window in device 100. In some embodiments, bottom 106 and/or plurality of walls 108 comprises at least one transparent window 114. In some embodiments, bottom 106 comprises one transparent window 114 and plurality of walls 108 comprises three transparent windows 114. In some embodiments, bottom 106 comprises three transparent windows 114, and plurality of walls 108 comprises two transparent windows 114. In some embodiments, the at least one transparent window 114 comprises a thin 1 mm glass window in bottom 106 configured to minimize light scatter. In some embodiments, at least one transparent window 114 in plurality of walls 108 allows for the alignment and/or positioning of at least one transducer.

Aspects of the present invention relate to at least one material for body 102 of device 100. In some embodiments, body 102 comprises at least one of metal, titanium, aluminum, steel, alloy, polymer, PLA, PVA, PEEK, ABS, acrylic glass, plexiglass, polycarbonate, PTFE, PP, UV curing optical adhesives, UV curing glue, THORLABS UV and/or Optical Glue, THORLABS N0A61 glue. In some embodiments, body 102 comprises any of a material that maintains temperature, a high density material, a waterproof material, a water resistant material, a non-porous material, a low porous material, an antibiotic material, a low pore material, an impermeable material.

Aspects of the present invention relate to at least one material for transparent window 114 of device 100. In some embodiments, the at least one transparent window 114 comprises at least one of a silicate glass, a soda-lime glass, a borosilicate glass, a lead glass, an aluminosilicate glass, a barium glass, a thorium oxide glass, a lanthanum oxide glass, an iron oxide glass, a cerivum (IV) oxide glass, a fluorine silicate glass, a glass-ceramic, a non-silicate glass, an acrylic glass, a plexiglass, a polycarbonate, a polyethylene terephthalate, a quartz, a quartz glass, a standard borosilicate and/or a quarts slide (75 mm×25 mm×1 mm), a standard coverslip (25 mm×25 mm), a trimmed glass slide, a photoacoustically transparent glass, and any combination thereof. In some embodiments, transparent window comprises any material compatible with autofluorescence microscopy as would be known by one of ordinary level of skill in the art. In some embodiments, transparent window comprises materials to reduce noise (optical and acoustic), reduce optical scattering, reduce acoustic scattering, reduce residual acoustic generation, and/or reduce the interaction with light and/or sound.

Aspects of the present invention relate to coatings for inside surface 110, outside surface 112 and/or transparent window 114 of device 100. In some embodiments, inside surface 110 and/or outside surface 112 comprises at least one coating. In some embodiments, the at least one transparent window 114 comprises at least one coating. In some embodiments, the coating comprises at least one of biocompatible coating, antimicrobial coating, hydrophilic coating, hydrophobic coating, oleophobic coating, waterproof coating, polymer coating, acrylic coating, ceramic glass coating, reflective coating, anti-reflective coating, UV-curing glue, UV optical glue. In some embodiments, the at least one coating may comprise any material compatible with autofluorescence microscopy, or enabling autofluorescence microscopy, as would be known by one of ordinary level of skill in the art. In some embodiments, the at least one coating comprises materials to reduce noise (optical and acoustic), reduce optical scattering, reduce acoustic scattering, reduce residual acoustic regeneration, and/or reduce the interaction with light and/or sound.

Aspects of the present invention relate to a shape for body 102 of device 100. In some embodiments, body 102 is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular.

Aspects of the present invention relate to a shape for the at least one transparent window 114 of device 100. In some embodiments, each transparent window 114 comprise the same shape. In some embodiments, the at least one transparent window 114 comprises at least one shape. In some embodiments, the at least one transparent window 114 is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular.

Aspects of the present invention relate to dimensions for device 100. In some embodiments, body 102 has a length ranging between about 10 mm and about 250 mm, a width ranging between about 10 mm and about 250 mm, and a height ranging between about 5 mm and about 50 mm. In some embodiments, cavity 104 has a volume ranging between about 10,000 $mm^3$ and about 200,000 $mm^3$. In some embodiments, bottom 106 has an area ranging between about 50 $mm^2$ and about 3000 $mm^2$. In some embodiments, bottom 106 is configured to receive a 75 mm×25 mm glass slide. In some embodiments, positioning stem 122 has a length ranging between about 10 mm and about 500 mm. In some embodiments, the at least one transparent window has a length ranging between about 1 mm and about 20 mm, a width ranging between about 1 mm and about 20 mm, and a thickness ranging between about 0.01 mm and about 5 mm.

Aspects of the present invention relate to a system comprising any microscopy device of the present invention and further comprising other peripherals including, but not limited to, computing devices, sensors, lenses, light sources, LED lights, objectives, lasers, transducers, and any combination thereof. In some embodiments, system 200 comprises any device 100 of the present invention, and further comprises at least one of a transducer 150 and an objective 160. In some embodiments, system 200 further comprises computing device 600 and at least one of sensor 665.

Aspects of the present invention relate to a computing device for a microscopy device of the present invention. In some embodiments, device 100 further comprises computing device 600 communicatively connected to transducer 150 and objective 160 comprising a processor and a non-transitory computer-readable medium with instructions stored thereon, which when executed by a processor, performs the steps comprising illuminating a sample with objective 160 and capturing signals from the sample with transducer 150. In some embodiments, objective 160 is paired with a light source, LED, laser, light bulb, and any combination thereof, to produce light and illuminate a sample.

Aspects of the present invention relate to a photoacoustic microscopy method, comprising the steps of providing any device 100 of the present invention, affixing positioning stem 122 to a rigid location, submerging a sample in a liquid in cavity 104, positioning objective 160 to illuminate the sample through transparent window 114, and submerging transducer 150 in the liquid and reading signals from the sample.

In some embodiments, transducer 150 is submerged in a liquid in cavity 104 configured to read at least one signal from at least one sample also submerged in the liquid. In some embodiments, objective 160 is configured to illuminate the sample through the at least one transparent window 114 in body 102. In some embodiments, at least a portion of transducer 150 extends into cavity 104 through an opening in the top of cavity 104.

Computing Device

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled, or interpreted, including but not limited to C, C++, C #, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another.

In some embodiments, elements of the networked portion of the invention may be implemented over a Virtual Private Network (VPN).

Figure 6:
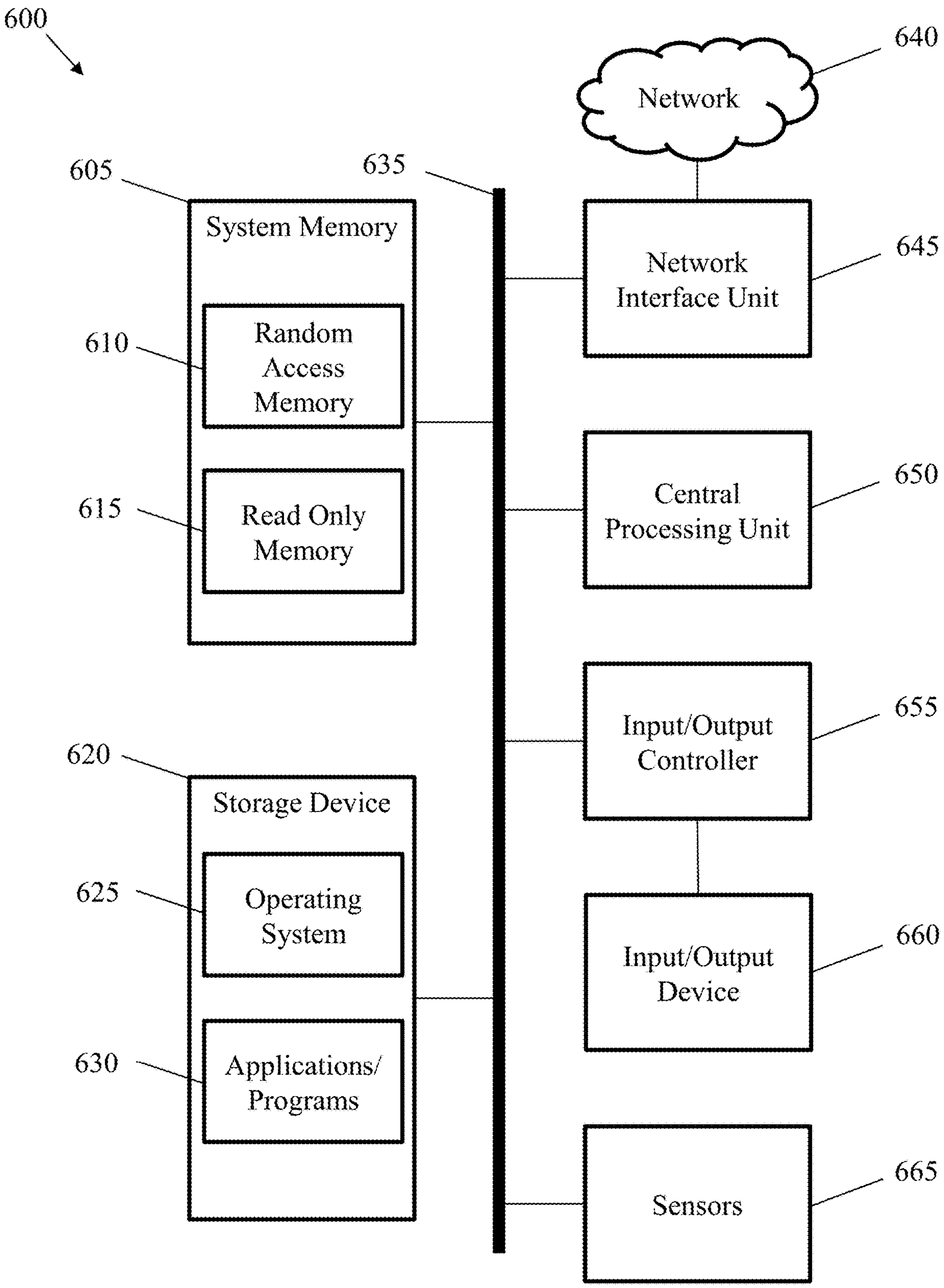
FIG. 6 is a computing device in which aspects of the present invention may be practiced in accordance with some embodiments.

FIG. 6 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 6 depicts an illustrative computer architecture for a computer 600 for practicing the various embodiments of the invention. The computer architecture shown in FIG. 6 illustrates a conventional personal computer, including a central processing unit 650 ("CPU"), a system memory 605, including a random access memory 610 ("RAM") and a read-only memory ("ROM") 615, and a system bus 635 that couples the system memory 605 to the CPU 650. A basic input/output system containing the basic routines that help to transfer information between elements within the computer, such as during startup, is stored in the ROM 615. The computer 600 further includes a storage device 620 for storing an operating system 625, application/program 630, and data.

The storage device 620 is connected to the CPU 650 through a storage controller (not shown) connected to the bus 635. The storage device 620 and its associated computer-readable media provide non-volatile storage for the computer 600. Although the description of computer-readable media contained herein refers to a storage device, such as a hard disk or CD-ROM drive, it should be appreciated by those skilled in the art that computer-readable media can be any available media that can be accessed by the computer 600.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 600 may operate in a networked environment using logical connections to remote computers through a network 640, such as TCP/IP network such as the Internet or an intranet. The computer 600 may connect to the network 640 through a network interface unit 645 connected to the bus 635. It should be appreciated that the network interface unit 645 may also be utilized to connect to other types of networks and remote computer systems.

The computer 600 may also include an input/output controller 655 for receiving and processing input from a number of input/output devices 660, including a keyboard, a mouse, a touchscreen, a camera, a microphone, a controller, a joystick, or other type of input device. Similarly, the input/output controller 655 may provide output to a display screen, a printer, a speaker, or other type of output device. The computer 600 can connect to the input/output device 660 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 620 and/or RAM 610 of the computer 600, including an operating system 625 suitable for controlling the operation of a networked computer. The storage device 620 and RAM 610 may also store one or more applications/programs 630. In particular, the storage device 620 and RAM 610 may store an application/program 630 for providing a variety of functionalities to a user. For instance, the application/program 630 may comprise many types of programs such as a word processing application, a spreadsheet application, a desktop publishing application, a database application, a gaming application, internet browsing application, electronic mail application, messaging application, and the like. According to an embodiment of the present invention, the application/program 630 comprises a multiple functionality software application for providing word processing functionality, slide presentation functionality, spreadsheet functionality, database functionality and the like.

The computer 600 in some embodiments can include a variety of sensors 665 for monitoring the environment surrounding and the environment internal to the computer 600. These sensors 665 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be construed as limiting in any way the remainder of the disclosure.

Example 1: Photoacoustic Microscopy Platform

In some aspects, the disclosed invention enables photoacoustic microscopy of brain slices. In some embodiments, the thin, 1 mm, glass windows underneath the internal chamber have been included to minimize light scatter and residual acoustic generation. In some embodiments, the chamber holds media and other liquids required to conduct acoustic waves collected by an immersible transducer. In some embodiments, the addition of an M3-screw mounted pipe allows the system to be held with concentric clamping action. In some embodiments, the invention allows for the usage of a 75 mm×25 mm glass side. In some embodiments, the invention allows for differing volumes of desired media. In some embodiments, side windows enable easy alignment with the transducer.

In some aspects, the disclosed invention is directed to devices that enable photoacoustic microscopy of brain slices. In some embodiments, the disclosed invention comprises thin, 1 mm, glass windows underneath the internal chamber to minimize light scatter. In some embodiments, the chamber holds media and other liquids required to conduct acoustic waves collected by an immersible transducer. In some embodiments, an M3-screw mounted pipe allows the system to be held with concentric clamping action. In some embodiments, different versions of the invention allow for usage of a 75 mm×25 mm glass side, or for differing volumes of desired media. In some embodiments, side windows enable easy alignment with the transducer.

Figure 7:
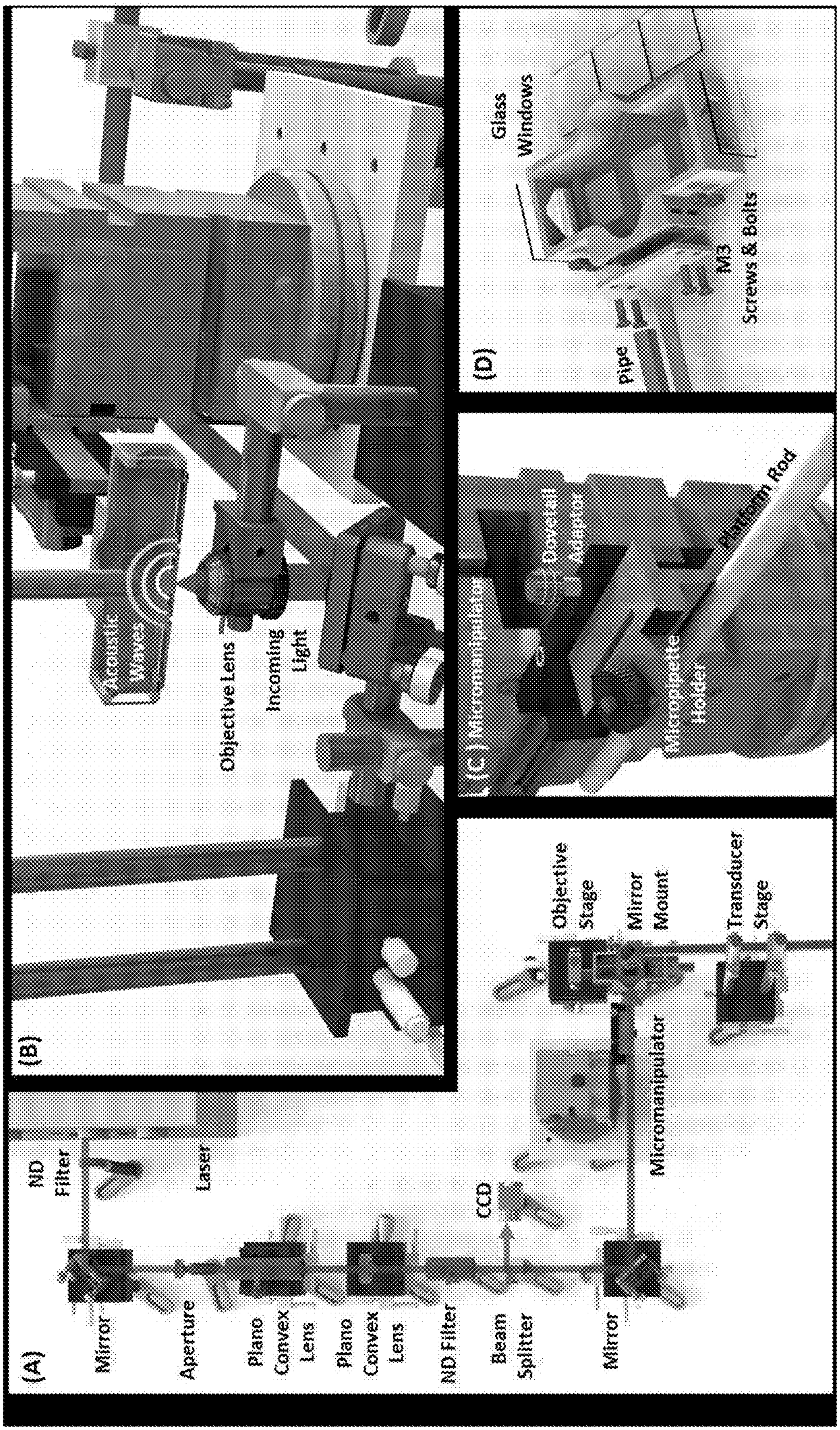
FIG. 7A through FIG. 7D shows an exemplary method for photoacoustic detection using an exemplary system comprising any microscopy device of the present invention, a laser, a transducer, and an objective.

FIG. 7A through FIG. 7D shows an exemplary method for photoacoustic detection using an exemplary system comprising any microscopy device of the present invention, a laser, a transducer, and an objective. Now referring to FIG. 7A, shown is an exemplary system architecture for an exemplary photoacoustic microscopy platform of the present invention. In some embodiments, an excitation light from a 700 nm tunable laser is spatially filtered and directed to an objective lens at the Photoacoustic Microscopy (PAM) setup. In some embodiments, an in-line beam splitter samples some of the light returning from the PAM setup to image the sample. Referring now to FIG. 7B, in some embodiments light is directed onto the sample within the custom PAM sample tank from a 40× objective lens, and a confocally aligned focused ultrasound transducer detects photoacoustic signals produced by the sample. Referring now to FIG. 7C, in some embodiments, a platform rod (positioning stem) connects the micromanipulator to the custom PAM tank, allowing precise sample manipulation. Referring now to FIG. 7D, shown is an exploded view of the custom 3D printed sample tank.

In some aspects, the present invention relates to a NIR-PAM system. In some embodiments, a laser first passes through a neutral density filter and is guided by a mirror through a 1 mm aperture. In some embodiments, a portion of the laser light passes through the mirror and strikes a reference transducer to time the firing of the laser. In some embodiments, it is then focused through a plano-convex lens and further collimated by another planoconvex lens to a diameter of 6 mm. In some embodiments, the light then passes through a neutral density filter and a beam splitter. The collimated light is directed to a 40× objective lens, and focused on a sample in a custom 3D printed water tank.

In some embodiments, the beam splitter allows light coming back from the PAM system to be viewed on an in-line camera. In some embodiments, the tank is connected to a micromanipulator (Patchstar, Scientifica) which allows for the manipulation and scanning of samples. In some embodiments, the tank is filled with PBS, and a focused ultrasound transducer is confocally aligned above the focal point of the objective lens. In some embodiments, photoacoustic signals generated by the laser are detected by a focused ultrasound transducer.

In some embodiments, collimated light (from a laser, but possibly an LED) is focused by the objective. In some embodiments, the objective is positioned so that its focal length is where the volume of the sample would be. For scans, in some embodiments, the positioning stem is moved via a micromanipulator in a raster-scan fashion. In some embodiments, the transducer picks up the signals coming from the raster scan and the computer reconstructs an image or whatever it needs.

In some embodiments, alignment from the light source, laser, LED, and the like, to the objective, is done via at least one mirror. In some embodiments, alignment is performed with 3 mirrors. In some embodiments, a CCD camera assists in alignment, but rather using the light coming from the opposite direction.

The disclosures of each and every patent, patent application, and publication cited herein are hereby each incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A microscopy device comprising:

a body with a cavity;

the cavity having a bottom and plurality of walls extending upward from the bottom, and forming an inside surface and an outside surface of the body;

the cavity further comprising an opening opposite the bottom;

at least one transparent window in the bottom;

an adapter extending outward from a first wall of the plurality of walls;

a positioning stem with an adapter plate fixedly attached to the adapter of the device; and at least one threaded hole in the adapter of the device configured to fixedly attach the adapter plate of the positioning stem with a threaded bolt, wherein the body has a length ranging between 10 mm and 250 mm, a width ranging between 10 mm and 250 mm, and a height ranging between 5 mm and 100 mm.

2. The device of claim 1, wherein the threaded bolt is an M3 bolt.

3. The device of claim 1, wherein the positioning stem extends outward from the adapter.

4. The device of claim 1, wherein the bottom comprises at least one transparent window, and the plurality of walls comprises at least one transparent window.

5. The device of claim 4, wherein the at least one transparent window in the plurality of sidewalls comprises at least one glass cover slip.

6. The device of claim 1, wherein the at least one transparent window comprises at least one of a silicate glass, a soda-lime glass, a borosilicate glass, a lead glass, an aluminosilicate glass, a barium glass, a thorium oxide glass, a lanthanum oxide glass, an iron oxide glass, a cerivum (IV) oxide glass, a fluorine silicate glass, a glass-ceramic, a non-silicate glass, an acrylic glass, a plexiglass, a polycarbonate, a polyethylene terephthalate, a quartz glass, a glass slide, and/or a cover slip.

7. The device of claim 1, wherein the at least one transparent window has a thickness ranging between 0.1 mm and 1 mm.

8. The device of claim 1, wherein the body comprises at least one of titanium, aluminum, steel, alloy, PLA, PVA, PEEK, ABS, acrylic glass, plexiglass, polycarbonate, PTFE, PP, and/or UV-curing glue.

9. The device of claim 1, wherein the inside surface of the body comprises at least one coating and the outside surface of the body comprises at least one coating.

10. The device of claim 9, wherein the coating comprises at least one of biocompatible coating, antimicrobial coating, hydrophilic coating, hydrophobic coating, oleophobic coating, waterproof coating, polymer coating, acrylic coating, ceramic glass coating, reflective coating, anti-reflective coating, and/or UV-curing glue.

11. The device of claim 1, wherein the body is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular.

12. The device of claim 1, wherein the at least one transparent window is a shape selected from the group consisting of: triangle, square, rectangle, quadrilateral, pentagon, hexagon, heptagon, octagon, nonagon, decagon, circle, oval, diamond, star, heart, trapezoid, cross, arrow, crescent, and irregular.

13. The device of claim 1, wherein the cavity has a volume ranging between 10,000 $mm^3$ and 200,000 $mm^3$.

14. A system comprising the device of claim 1, and further comprising at least one of a transducer, a light source, and an objective.

15. The system of claim 14, wherein the transducer is submerged in liquid of the cavity and configured to read at least one signal from at least one sample also submerged in the liquid.

16. The system of claim 15, wherein the objective is configured to illuminate the sample through the at least one transparent window in the body.

17. The device of claim 1, further comprising a computing device communicatively connected to a transducer and an objective comprising a processor and a non-transitory computer-readable medium with instructions stored thereon, which when executed by a processor, performs the steps comprising:

illuminating a sample with the objective; and capturing signals from the sample with the transducer.

18. A photoacoustic microscopy method, comprising the steps of:

providing the device of claim 1;

affixing the positioning stem to a rigid location;

submerging a sample in a liquid;

positioning an objective to illuminate the sample through the transparent window;

and submerging a transducer in the liquid and reading signals from the sample.

* * * * *